United States Patent
Hu et al.

(10) Patent No.: US 11,099,750 B2
(45) Date of Patent: Aug. 24, 2021

(54) COMPUTING SYSTEM WITH COMMUNICATION MECHANISM

(71) Applicant: Samsung Electronics Co., Ltd., Suwon-si (KR)

(72) Inventors: Chaohong Hu, San Jose, CA (US); Liang Yin, San Jose, CA (US); Hongzhong Zheng, Sunnyvale, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 16/414,555

(22) Filed: May 16, 2019

(65) Prior Publication Data

US 2019/0272111 A1 Sep. 5, 2019

Related U.S. Application Data

(62) Division of application No. 15/049,879, filed on Feb. 22, 2016, now Pat. No. 10,437,483.

(60) Provisional application No. 62/268,669, filed on Dec. 17, 2015.

(51) Int. Cl.
*G06F 3/06* (2006.01)

(52) U.S. Cl.
CPC ............ *G06F 3/0619* (2013.01); *G06F 3/061* (2013.01); *G06F 3/0659* (2013.01); *G06F 3/0673* (2013.01); *G06F 3/0679* (2013.01)

(58) Field of Classification Search
CPC ...... G06F 3/061; G06F 3/0659; G06F 3/0679; G06F 3/067; G06F 3/0688; G06F 13/161; G06F 3/0619; G06F 2009/45579; G06F 3/0604; G06F 15/7839; G06F 3/0673; H04L 29/06027; H04L 65/1043
See application file for complete search history.

(56) References Cited

U.S. PATENT DOCUMENTS

| | | | |
|---|---|---|---|
| 6,484,235 B1 | 11/2002 | Horst et al. | |
| 7,304,996 B1 * | 12/2007 | Swenson | H04L 45/7453 370/229 |
| 7,634,577 B1 * | 12/2009 | Grabelsky | H04L 65/1043 370/356 |
| 7,821,931 B2 | 10/2010 | Swenson et al. | |
| 8,266,496 B2 * | 9/2012 | Flynn | G06F 3/0608 714/758 |
| 8,874,831 B2 | 10/2014 | Lee et al. | |
| 8,874,989 B2 | 10/2014 | Fujimoto | |
| 9,069,658 B2 | 6/2015 | Borchers et al. | |
| 9,280,497 B2 | 3/2016 | Berke et al. | |
| 9,342,453 B2 | 5/2016 | Nale et al. | |
| 9,530,442 B1 * | 12/2016 | Hassner | G06F 11/0727 |
| 9,552,261 B2 | 1/2017 | Resch et al. | |

(Continued)

FOREIGN PATENT DOCUMENTS

| | | |
|---|---|---|
| CN | 1862476 A | 11/2006 |
| CN | 101646994 A | 2/2010 |

(Continued)

*Primary Examiner* — Zhuo H Li
(74) *Attorney, Agent, or Firm* — Perspective Law Group, Corp.

(57) ABSTRACT

A computing system including: a host interface configured to parse a command packet from a command address medium; and a command block, coupled to the host interface, configured to: assemble a command from the command packet.

6 Claims, 5 Drawing Sheets

(56) References Cited

U.S. PATENT DOCUMENTS

| | | |
|---|---|---|
| 9,575,908 B2 | 2/2017 | Takefman et al. |
| 9,965,434 B2 | 5/2018 | Verplanken et al. |
| 10,031,674 B2 | 7/2018 | Hanson et al. |
| 10,089,023 B2 | 10/2018 | Malina et al. |
| 10,359,949 B2 | 7/2019 | Seroff et al. |
| 2006/0259666 A1 | 11/2006 | Lee |
| 2010/0262721 A1* | 10/2010 | Asnaashari ............. G06F 3/067 710/5 |
| 2013/0086309 A1 | 4/2013 | Lee et al. |
| 2014/0040550 A1 | 2/2014 | Nale et al. |
| 2014/0164676 A1 | 6/2014 | Borchers et al. |
| 2014/0181364 A1 | 6/2014 | Berke et al. |
| 2014/0237176 A1 | 8/2014 | Takefman et al. |
| 2015/0220400 A1 | 8/2015 | Resch et al. |
| 2016/0085722 A1* | 3/2016 | Verplanken ......... G06F 13/4282 710/313 |
| 2016/0378364 A1 | 12/2016 | Malina et al. |
| 2017/0102873 A1 | 4/2017 | Hanson et al. |
| 2017/0116139 A1* | 4/2017 | McVay ................ G06F 3/0679 |

FOREIGN PATENT DOCUMENTS

| | | |
|---|---|---|
| CN | 102576318 A | 7/2012 |
| CN | 102623069 A | 8/2012 |
| CN | 102640113 A | 8/2012 |
| CN | 104866456 A | 8/2015 |
| CN | 104903868 A | 9/2015 |
| JP | 2006235960 A | 9/2006 |
| JP | 2006318456 A | 11/2006 |
| TW | 201214127 A | 4/2012 |
| TW | 201324520 A | 6/2013 |
| WO | 2012020544 A1 | 2/2012 |
| WO | 2014093220 | 6/2014 |

\* cited by examiner

COMPUTING SYSTEM WITH COMMUNICATION MECHANISM

CROSS-REFERENCE TO RELATED APPLICATION(S)

This application is a Divisional of co-pending U.S. patent application Ser. No. 15/049,879 filed Feb. 22, 2016, and the subject matter thereof is incorporated herein by reference thereto. U.S. patent application Ser. No. 15/049,879 filed Feb. 22, 2016 further claims the benefit of U.S. Provisional Patent Application Ser. No. 62/268,669 filed Dec. 17, 2015, and the subject matter thereof is incorporated herein by reference thereto.

TECHNICAL FIELD

An embodiment of the present invention relates generally to a computing system, and more particularly to a system for communication.

BACKGROUND

Modern consumer and industrial electronics, especially devices such as graphical computing systems, servers, televisions, projectors, cellular phones, portable digital assistants, and combination devices, are providing increasing levels of functionality to support modern life. Research and development in the existing technologies can take a myriad of different directions.

The vast majority of electronics require data storage. Communication of data to be stored is paramount. The communication between a storage device and the host device is becoming increasingly complex while providing flexibility to seamlessly mix different types of storage device and the host device.

Thus, a need still remains for a computing system with communication mechanism with robust and reliable mechanism while avoiding interoperability problems based proprietary information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system including: a host interface configured to parse a command packet from a command address medium; and a command block, coupled to the host interface, configured to: assemble a command from the command packet.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
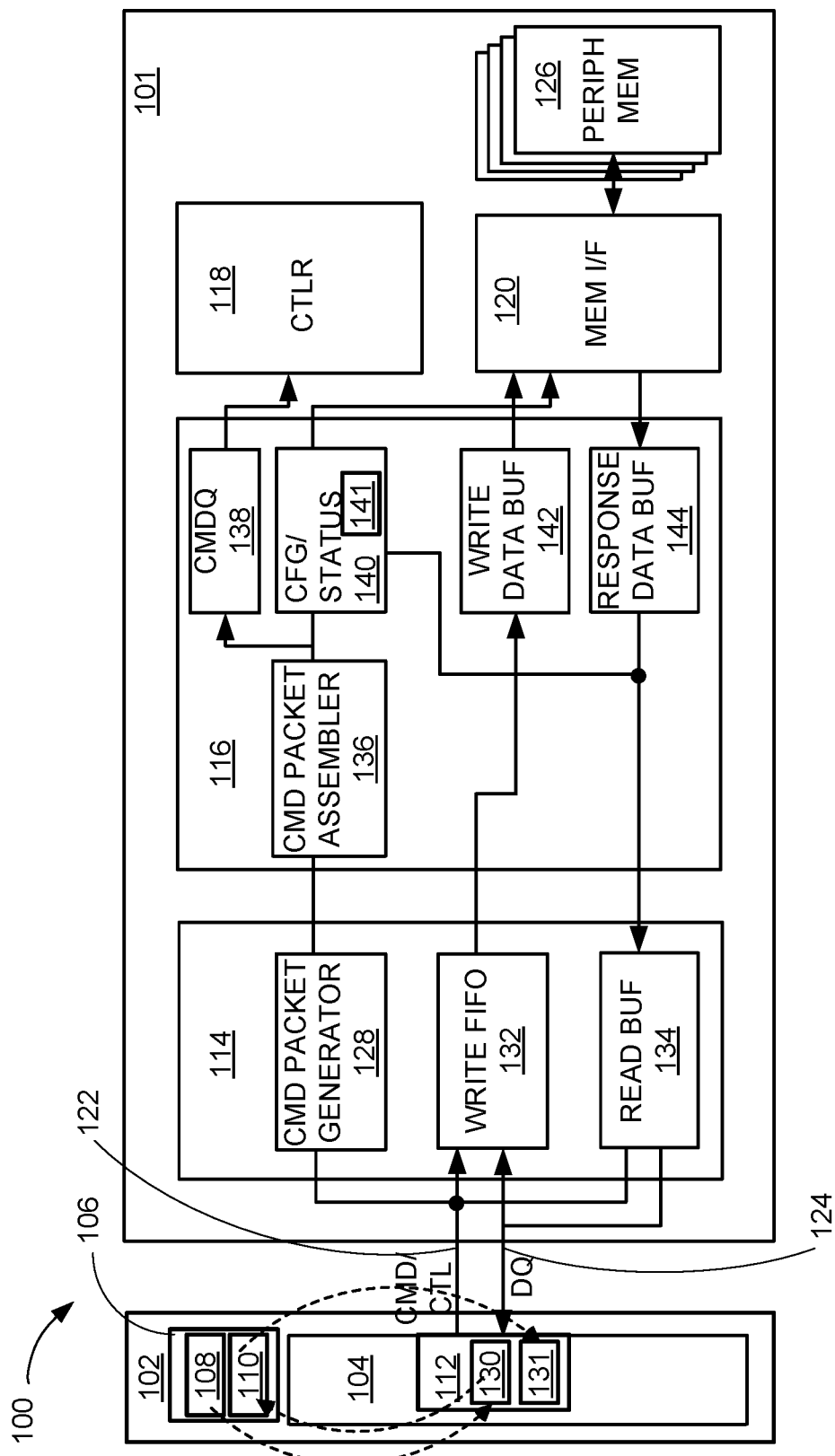
FIG. 1 is an example of a block diagram of a computing system with data communication mechanism in an embodiment.

Various embodiments provide a flexible memory interface; preserving functions of existing storage-type systems while utilizing a volatile memory interface, such as DDR. Various embodiments utilize the command address medium, as a specific example, a command and address (CA) bus based protocol for non-volatile memory dual inline memory modules (NVM-DIMM) that is fully independent of host central processing units, as specific example central processing units (CPUs)/platforms, algorithms and their implementations, which can be applied on any system with any ECC/Scramble mechanism, enabling broad system adoption. In other words, the command address medium can be used to transfer the commands or the command packets to a memory channel based NVM-DIMM system, instead of utilizing the data transfer medium. Embodiments can provide the flexibility to decouple proprietary implementations of the host computer's data transfer medium, that can include data transfers where proprietary error correct code (ECC), scrambling, and swizzling are involved.

Various embodiments enable the flexibility to operate a memory channel device without needing to know the details of the protection information from the host computer, or more specifically the host central processing unit. Embodiments enable processing and transmission of device commands over the command address medium. Meanwhile, embodiments enable the host computer or the host central processing unit to still utilize and send the protection information, such as ECC protected/scrambled/swizzled data, over the data medium for transfer.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the embodiments. However, it will be apparent that the embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the embodiments can be operated in any orientation. The embodiments can be numbered first embodiment, second embodiment, etc. as a matter of descriptive convenience and are not intended to have any other significance or provide limitations for an embodiment.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown an example of a block diagram of a computing system 100 with communication mechanisms in an embodiment of the present concepts. The block diagram depicts a storage system 101 connected a host computer 102.

In this example, the host computer 102 can provide computational and interface resources for the computing system 100. The host computer 102 can also provide or interface with storage resources for or to the computing system 100. The storage system 101 can provide storage capacity or extended storage capacity for the computing system 100 or as a specific example, for the host computer 102.

As an example of an embodiment, the host computer 102 can communicate with the storage system 101 over a particular memory interface, such as a volatile memory interface, or as a more specific example over a Dual data rate (DDR) volatile memory interface. For flexibility, the computing system 100 can mix and match various combinations for the host computer 102 and the storage system 101. For example, the host computer 102 can be designed to operate with a volatile memory, such as DDR as mentioned earlier, while the computing system 100 would like to have more persistent memory for the storage system 101, such as a non-volatile memory, or as a more specific examples, solid state disks (SSD) or Flash memory devices. Embodiments allow for the host computer 102 to operate with the storage system 101 as a nonvolatile memory while utilizing a volatile memory interface, such as the physical layer of the DDR interface.

For illustrative purposes, the computing system 100 is described as mixing and matching the host computer 102 with the storage system 101, although it is understood that the configuration for the computing system 100 can be different. For example, the host computer 102 can be connected to different type of system not necessarily for proving storage function. Also for example, the host computer 102 can utilize different physical layer interfaces other than a storage interface, such as the volatile memory or DDR interface. The host computer 102 can use a different communication protocol other than DDR. As an example, the host computer 102 can use a network protocol interface, such for local area network (LAN), storage area network (SAN), or metropolitan area network (MAN). The host computer 102 can also utilize a wireless interface as well as wired interface.

Returning to the description of the host computer 102, the host computer 102 can be implemented in a number of ways. As an example, the host computer 102 can be as a server, workstation, a router, a desktop computer, a mobile computing device or a combination thereof. The host computer 102 can include at least a host central processing unit 104, and a host memory 106 coupled to the host central processing unit 104.

The host memory 106 can provide instruction code or data storage for the host computer 102. As an example, the host memory 106 can include drivers 108 and an address map 110. The drivers 108 can be code for the host computer 102 to interact with the storage system 101 as well as other functions for the host computer 102. The address map 110 can provide system address information for the system addresses that the host computer 102 can utilize to interact with the storage system 101.

As a specific example, the host computer 102 can utilize the drivers 108 to convert commands 130 to command packets 131 with the address map 110, as depicted by the dashed lines in FIG. 1. The command packets 131 can be sent to the storage system 101. The commands 130 are operational instructions from the host computer 102 to the storage system 101. Examples of the commands 130 include write commands or read commands to and from the storage system 101, respectively. Other examples of the commands 130 include status query and clear commands. The command packets 131 are portions for each of the commands 130 to be sent to the storage system 101. The command packets 131 can include formatting based on the commands 130. The commands 130 and the command packets 131 will be further described later.

The host central processing unit 104 can provide the execution hardware circuitry for the host computer 102. The host central processing unit 104 can retrieve code or data from the host memory 106.

For illustrative purposes, the computing system 100 is described with the host memory 106 separate and distinct from the host central processing unit 104, although it is understood that the computing system 100 can be configured differently. For example, the host central processing unit 104 can include at least part of the host memory 106. The host central processing unit 104 can also include at least a portion of the drivers 108. The address map 110 can also reside at least partially within the host central processing unit 104.

The host central processing unit 104 can include a peripheral interface 112. The peripheral interface 112 can provide interface functions to and from the host computer 102. As an example, the peripheral interface 112 allows the host computer 102 to utilize the storage system 101.

The host central processing unit 104 can be implemented with hardware circuitry in a number of different manners. For example, the host central processing unit 104 can be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The peripheral interface 112 can be implemented with hardware circuitry in a number of different manners. For example, the peripheral interface 112 can be implemented with digital circuits, analog circuits, or a combination thereof. Also for example, the peripheral interface 112 can be implement with logic gates, transistors, or a combination thereof.

In this example, the storage system 101 can include a host interface 114, a command block 116, a controller 118, and a memory interface 120. The host interface 114 provides communication function between the storage system 101 and the host computer 102 or as a more specific example to the peripheral interface 112. The host computer 102 and the storage system 101 can communicate with a command address medium 122 and a data medium 124.

The command address medium 122 can provide communication of commands, addresses, and control. The command address medium 122 can be wired or wireless. The command address medium 122 can operate in a bidirectional or unidirectional manner. The command address medium 122 can function in full-duplex or simplex.

The data medium 124 can provide communication of data. The data medium 124 can be wired or wireless. The data medium 124 can operate in a bidirectional or unidirectional manner. The data medium 124 can function in full-duplex or simplex.

The host interface 114 can be implemented in a number of ways. For example, the host interface 114 can be implemented with hardware circuitry including digital circuits, analog circuits, finite state machines, programmable logic or circuits, a processor core, a processor, or a combination thereof.

In this embodiment, as an example, the command block 116 processes the command packets 131 from the host computer 102. The command block 116 can also interact with the controller 118 for processing the command packets 131. The command block 116 can further retrieve data from the memory interface 120.

Also for example, the controller 118 can provide the interface to, operational control of, or a combination thereof for the storage system 101. As a specific example, the controller 118 can interact with the memory interface 120. The memory interface 120 provides access to a peripheral memory 126. In this example, the controller 118 can execute the commands 130 for access to the peripheral memory 126 that can be non-volatile memory, such as a solid state disk or Flash memory device or hard disk drives (HDD).

The controller 118 can be implemented in a number of ways. For example, the controller 118 can be implemented as a processor, a processor core, an application specific integrated circuit (ASIC), an embedded processor, a microprocessor, a hardware control logic, a hardware finite state machine (FSM), a digital signal processor (DSP), a FPGA, or a combination thereof. Also for example, the controller 118 can be implement with hardware circuitry such as digital circuitry or logic, analog circuitry, or a combination thereof.

Returning to the description for the host interface 114, the host interface 114 can include a command packet generator (CPG) 128, a host write buffer 132, and a host read buffer 134. The command packet generator 128 generates or parses the command packets 131 from the host computer 102. The command packet generator 128 generates or parses the command packets 131 based on information carried on the command address medium 122, as described further throughout later.

The host write buffer 132 aids in transfer of information between the host computer 102 and the storage system 101. As an example, the host write buffer 132 can receive information from the command address medium 122, the data medium 124, or a combination thereof. The host write buffer 132 can be used as temporary storage before the information is retrieved and utilized by other portions of the storage system 101.

The host write buffer 132 can be implemented in a number of ways. For example, the host write buffer 132 can be implemented as a processor, a processor core, a microprocessor, a hardware control logic, a hardware finite state machine (FSM), a digital signal processor (DSP), a FPGA, or a combination thereof. The host write buffer 132 can also be implement with memory structures, such as random access memory (RAM), logic registers, or a combination thereof. Also for example, the command block 116 can be implement with hardware circuitry such as digital circuitry or logic, analog circuitry, or a combination thereof. As a more specific example, the host write buffer 132 can be implemented with a first-in first-out (FIFO) function, a linked list, or a queue.

The host read buffer 134 aids in transfer of information between the host computer 102 and the storage system 101. As an example, the host read buffer 134 can receive information from command block 116, the controller 118, the memory interface 120, or a combination thereof. The host read buffer 134 can provide information to the command address medium 122, the data medium 124, or a combination thereof. The host read buffer 134 can be used as temporary storage before the information is retrieved and utilized by the host computer 102.

The host read buffer 134 can be implemented in a number of ways. For example, the host read buffer 134 can be implemented as a processor, a processor core, a microprocessor, a hardware control logic, a hardware finite state machine (FSM), a digital signal processor (DSP), a FPGA, or a combination thereof. The host read buffer 134 can also be implement with memory structures, such as random access memory (RAM), logic registers, or a combination thereof. Also for example, the command block 116 can be implement with hardware circuitry such as digital circuitry or logic, analog circuitry, or a combination thereof. As a more specific example, the host read buffer 134 can be implemented with a first-in first-out (FIFO) function, a linked list, or a queue.

Returning to the description of the command block 116, as an example, the command block 116 can include a command packet assembler (CPA) 136, a command queue 138, a configuration status block 140, a memory write buffer 142, a response buffer 144, or a combination thereof. The command packet assembler 136 can accumulate a sequence or subsequences of the command packets 131 into a full version of one of the commands 130. More details for the command packet assembler 136 will be described later.

The command block 116 can be implemented in a number of ways. For example, the command block 116 can be implemented as a processor, a processor core, an application specific integrated circuit (ASIC), a microprocessor, a hardware control logic, a hardware finite state machine (FSM), a digital signal processor (DSP), a FPGA, or a combination thereof. Also for example, the command block 116 can be implement with hardware circuitry such as digital circuitry or logic, analog circuitry, or a combination thereof.

In this example, the command queue 138 can provide a storage for full versions of the commands 130. The commands 130 from the command queue 138 can be executed by the controller 118. The controller 118 can interact with the memory interface 120 to complete the execution of the commands 130.

Also in this example, the configuration status block 140 can provide the ability to configure the storage system 101 and to retrieve status information 141 from the storage system 101. The memory write buffer 142 aids in transfer of information between the memory interface 120 and host write buffer 132, the controller 118, the command packet assembler 136, the command queue 138, the configuration status block 140, or a combination thereof. As an example, the memory write buffer 142 can be used as temporary storage before the information is retrieved and utilized by other portions of the storage system 101.

The response buffer 144 aids in transfer of information between the host read buffer 134 and other portions of the storage system 101. As examples, the response buffer 144 can provide information to the host read buffer 134 from the memory interface 120, the configuration status block 140, the controller 118, or a combination thereof.

This embodiment can be an example of an application to move data persistence closer to host central processing unit 104 or more generally to move data close to the host central processing unit 104 for performance improvement, power savings, or a combination thereof, especially in an era of big-data.

It has been discovered that embodiments provide a flexible memory interface while preserving functions of an existing storage systems while utilizing a volatile memory interface, such as DDR. Various embodiments utilize the command address medium 122, as a specific example a command and address (CA) bus based protocol for non-volatile memory dual inline memory module (NVM-DIMM) that is fully independent of host central processing unit 104, as specific example central processing units (CPUs)/platforms, algorithms and their implementations, which can be applied on any system with any ECC/Scramble mechanism, enabling broad system adoption. In other words, the command address medium 122 can be used to transfer the commands 130 or the command packets 131 instead of utilizing the data medium 124. Embodiments can be provide the flexibility to decouple proprietary implementation of the host computer 102 on the data medium 124 that can include data transfers where proprietary error correct code (ECC), scrambling, and swizzling are involved.

As more specific example for this embodiment, the computing system 100 can utilize the command address medium 122 instead of the data medium 124 to communicate the commands 130 as command packets 131 from the host computer 102 to the storage system 101. Examples of the commands 130, or as a specific example the command packets 131, can include SSD commands, such as write data, read data, read status, configuration commands, clear commands, or a combination thereof. The computing system 100 or the host computer 102 can utilize the drivers 108 to use predetermine address space in the system address and the address map 110 to communicate the commands 130, or as a specific example the command packets 131, over the command address medium 122.

Continuing this example, the computing system 100 can utilize the data medium 124 to transfer data between the host computer 102 and the storage system 101. Other information associated with the data over the data medium 124 including ECC encoding, scrambling, swizzling, or a combination thereof can be treated as data and stored in the storage system 101 without change and without needing to know the details of the ECC, scrambler, and swizzler. The host computer 102 can transfer address information, such as a memory region of the peripheral memory 126, of where to store this data over the command address medium 122.

Further continuing this example, the computing system 100 can retrieve status information 141 for the execution of the commands 130 by the storage system 101 through the data medium 124. The status information 141 can be retrieved from the configuration status block 140.

As a more specific example, the commands 130, or as a specific example the command packets 131, over the command address medium 122 can include status query, command query, and configuration read. These types of commands 130 can also be processed through the command packet generator 128, the command packet assembler 136, or a combination thereof. In this example, the command packet assembler 136 handles one of the command 130 at a time. Once all the fields of the command packets 131 is processed by the command packet assembler 136, the completed or full command 130 can be moved to the command queue 138.

Further, the command packet generator 128 can parse the address bits from the command address medium 122. Examples of the address bits include band group, bank, row, and column information. Also as an example, the status information 141 in the configuration status block 140 can be directly accessed for read by the host computer 102 utilizing the address map 110, which remaps the system address space.

Figure 2:
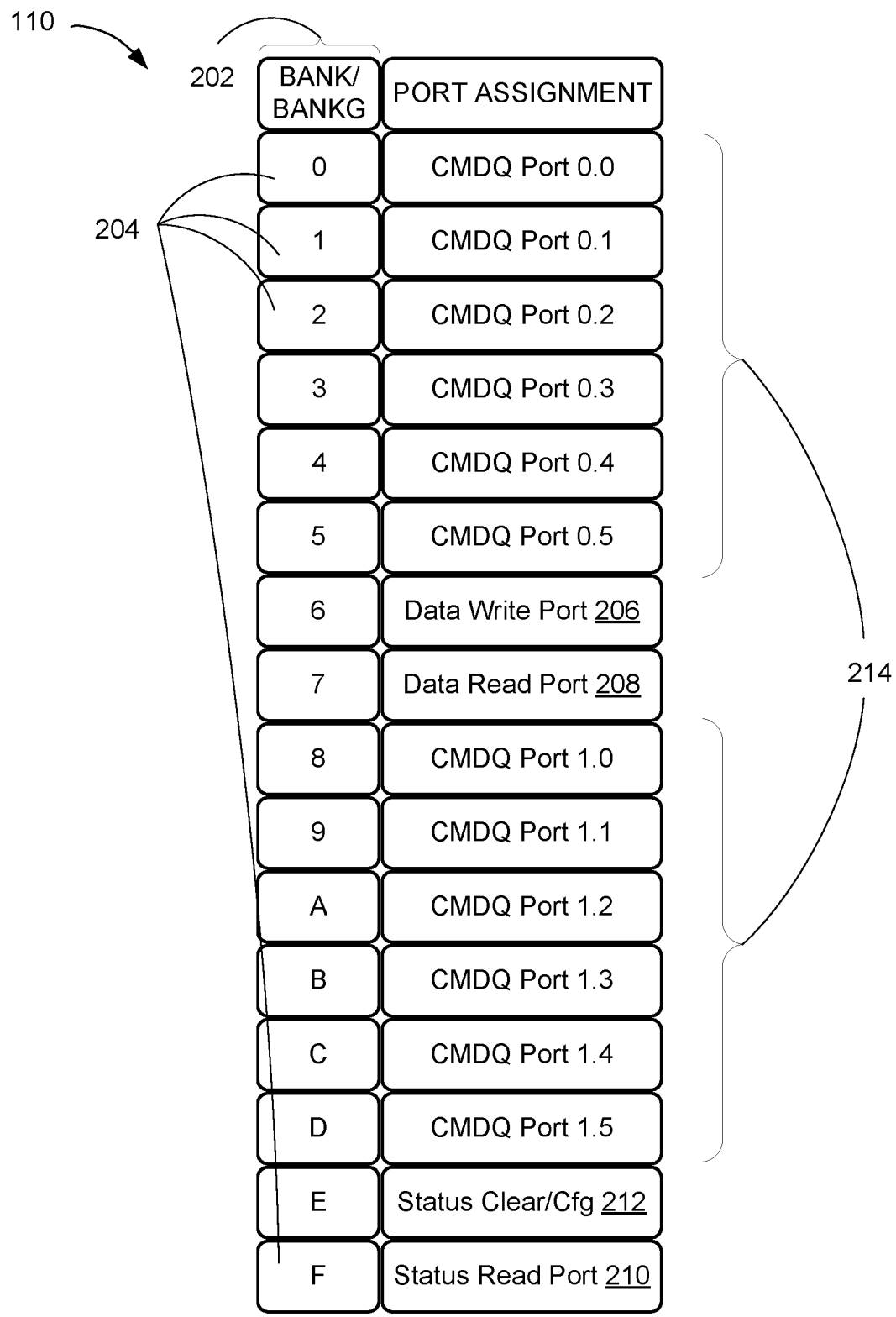
FIG. 2 is a more detailed view of an example of the address map for the communication mechanism utilized by the computing system in an embodiment.

Referring now to FIG. 2, therein is shown more detailed view of an example of the address map 110 for the communication mechanism utilized by the computing system 100 of FIG. 1 in an embodiment. As described earlier, the address map 110 enables the host computer 102 of FIG. 1 to interact with the storage system 101 of FIG. 1.

As a specific example, the host computer 102 can utilize the drivers 108 of FIG. 1 with the address map 110 to communicate the commands 130 of FIG. 1 through the command address medium 122 of FIG. 1 and not the data medium 124 of FIG. 1. The commands 130 from the command address medium 122 can be processed by the command packet generator 128 of FIG. 1, the command packet assembler 136 of FIG. 1, or a combination thereof.

As an example, the address map 110 depicted in FIG. 2 is for an interface for DDR even though the storage system 101 can include non-volatile memory. The address map 110 can be organized for a bank group 202 or banks 204 in the bank group 202. As a specific example, the bank group 202 can be represented with 4 bits in the address map 110 and the banks 204 are depicted in hexadecimal address from 0 to F. Also, row and column addresses can be provided in the address map 110 as in the example for DDR address. Depending on the specifics of the peripheral memory 126 of FIG. 1, the row address can be 14 to 18 bits and the column address can be 10 bits, but other sizes can be used in other embodiments.

In this example, the address map 110 can be divided into different program regions. One of the banks 204 can be dedicated for a write port 206. The write port 206 allows the host computer 102 to write data to the storage system 101. Another of the banks 204 can be dedicated for a read port 208. The read port 208 allows the host computer 102 to read data from the storage system 101.

Continuing with this example, another of the banks 204 can be dedicated for status read port 210. The status read port 210 allows the host computer 102 to read the status information 141 of FIG. 1 of the commands 130 sent to the storage system 101. Yet another of the banks 204 can be dedicated to the status configuration read or clear 212. The status configuration read or clear 212 allows the host computer 102 to read the configuration from the storage system 101 or clear the configuration in the storage system 101.

The address maps 110, in this example, also has a number of command ports 214, each with multiple banks 204, for delivering each of the commands 130 of FIG. 1 as command packets 131 of FIG. 1 from the host computer 102 to the storage system 101. The banks 204 labeled 0 to 5 can collectively represent command port 0, labeled as port 00 through 0.5. The banks 204 labeled 8-D can collectively represent the command port 1, labeled port 1.0 to 1.5.

In this example, the host computer 102 can utilize the drivers 108 to ensure that each access by the host computer 102 to the storage system 101 is converted to the appropriate banks 204 in the address map 110. As a specific example, the command packets 131 can be mapped into the appropriate ports of the address map 110 to deliver the command 130.

Table 1 below depicts an example of the command packets 131. The column labeled "Field" represents the function of a portion for each of the command packets 131. The column labeled "Width" represents the number of bits for that particular Field. The column labeled "Comments" provide a short functional description for that Field.

TABLE 1

Command Packet

| Field | Width | Comments |
|---|---|---|
| VALID_MASK | 8 | To protect invalid operation (because of garbage value) |
| STREAM_ID | 8 | For reassembling of separated data |
| CMD_ID | 16 | Command tag |
| FEATURE | 16 | Information about host interface |
| OPCODE | 16 | Operational code for the command |
| SECTOR_COUNT | 16 | Data block size for write |
| LBA | 48 | LBA Considering block size |
| CRC | 8 | CRC for command, for signal delivery protection |

The STREAM_ID can be utilized by the command packet assembler 136 to assemble subsequences of the command packets 131 to one full command 130. The abbreviation for CRC is for cyclic redundancy check but any error detection scheme or code can be utilized for this Field.

Figure 3:
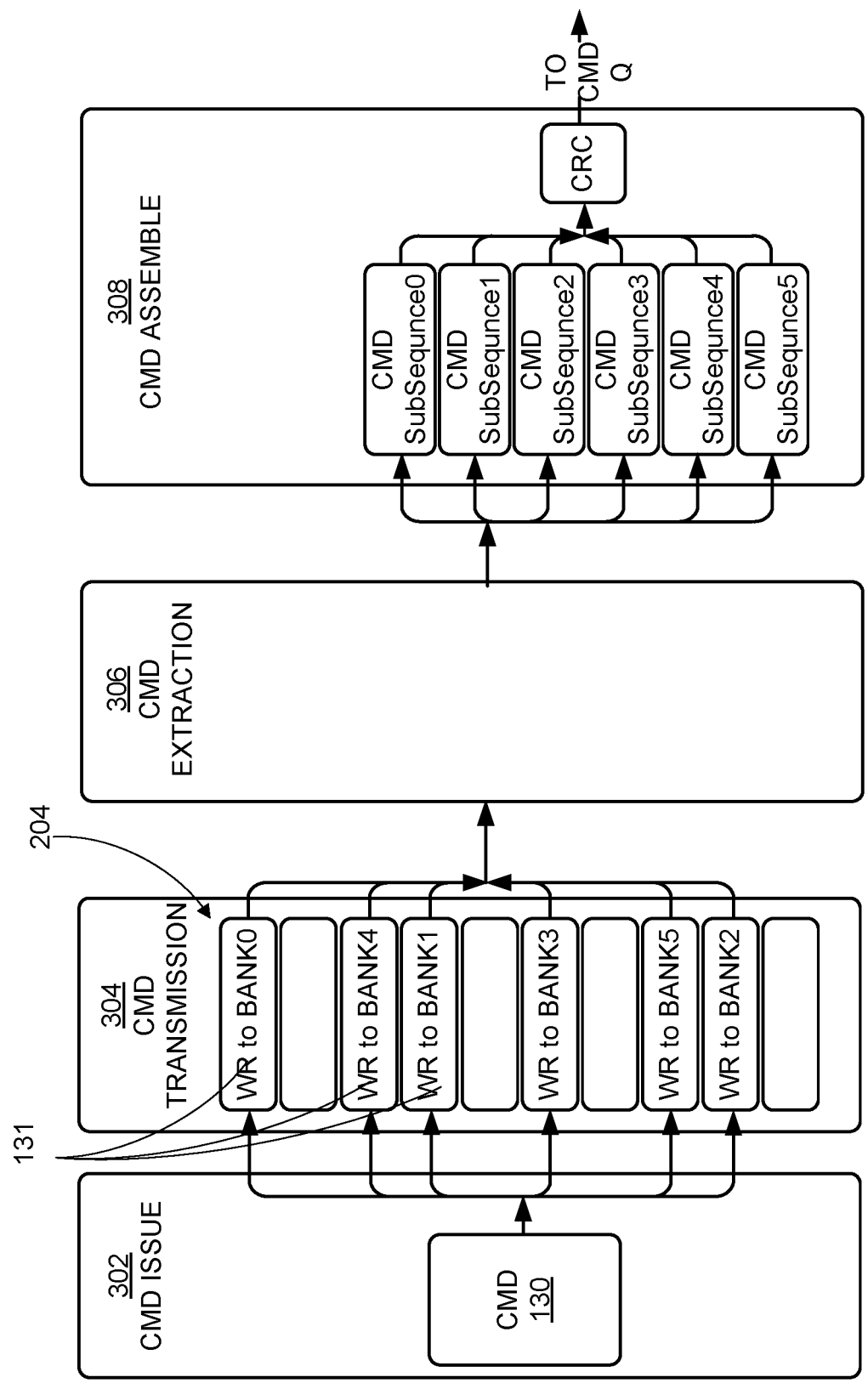
FIG. 3 is an example of a flow chart for issuing commands with the communication mechanism utilized by the computing system in an embodiment.

Referring now to FIG. 3, therein is shown an example of a flow chart for issuing commands 130 with the communication mechanism utilized by the computing system 100 of FIG. 1 in an embodiment. As an example for this embodiment, the flow chart can include a command issue 302, a command transmission 304, a command extraction 306, and a command assemble 308.

The command issue 302 prepares the commands 130 to be sent from the host computer 102 of FIG. 1. As an example, the host computer 102, or as a specific example the host central processing unit 104, can process the commands 130 with the drivers 108. This processing can partition or divide each of the commands 130 as appropriate to the fields of the address map 110 of FIG. 2. This processing can also partition or divide each of the commands 130 to the command packets 131 of FIG. 1. As a specific example, the drivers 108 can direct breaking each of the commands 130 into a subsequence of memory access or the command packets 131 and map the command packets 131 to the appropriate ports of the address map 110. The flow can progress to the command transmission 304.

The command transmission 304 sends the commands 130 from the host computer 102. As an example, the host computer 102, or as a specific example the host central processing unit 104, can send the partitioned or divided commands 130, or in other words the command packets 131 to the storage system 101. The host computer 102 can send the command packets 131 with the banks 204 to send the appropriate Field of FIG. 2 over the command address medium 122, and not over the data medium 124. Similarly, the storage system 101 receives the command packets 131 over the command address medium 122 and not over the data medium 124.

In the example shown in FIG. 3, the command 130 being processed is a write command and the command packets 131 are shown in the banks 204 labeled 0, 4, 1, 3, 5, and 2. The host computer 102 or the host central processing unit 104 can send out 6 memory writes over the command address medium 122, one for each command port in the address map 110 for banks 204 labeled 0 to 5. The command ports or each of the banks 204 can be reserved for read commands or write commands.

The host computer 102 can still perform direct reads or writes to the peripheral memory 126 as normal. The flow can progress to the command extraction 306. Direct read or write refers to the data from host central processing unit 104 can read/write from/to the storage system 101 without ECC decode/encode, discramble/scramble, nor involving swizzling.

The command extraction 306 receives the command packets 131 from the host computer 102. The command extraction 306 also parses the command packets 131 from the information received over the command address medium 122. As an example, the storage system 101, as a specific example, the host interface 114, can receive the command packets 131 from the command address medium 122. As an example of an embodiment, the command packet generator 136 of FIG. 1 parses and extracts the information, including the command packets 131, received from the command address medium 122, the host write buffer 132 of FIG. 1, or a combination thereof. The flow can progress to the command assemble 308.

The command assemble 308 composes a full command 130 from the command packets 131. As an example, the command block 116 of FIG. 1, or as a specific example the command packet assembler 136 of FIG. 1, orders the command packets 131 into the correct order based on the bank number from the banks 204 utilized in the command transmission 304. The command packets 131 can be also ordered based on the STREAM_ID field (shown in Table 1) in the command packet 131.

Further, the command assemble 308 can also perform error detection for each of the command packets 131 or the command 130 assembled by the command package assembler 136. The error detection can be done based on the CRC field shown in Table 1. Once error detection passes, the assembled command 130 can be sent to the command queue 138 of FIG. 1.

For illustrative purposes, the flow chart from the command issue 302 through the command assemble 308 is shown as a linear and unidirectional flow, although it is understood that the flow chart can be different. For example, concurrent activities can occur in the flow chart. As one of the commands 130 is being processed by the command assemble 308, another of the commands 130 can be processed concurrently by the command extraction 306 where both the command extraction 306 and the command assemble 308 can be performed in the storage system 101. Also, yet another of the commands 130 can be processed concurrently with the command transmission 304 as well as concurrent operation with the command issue 302, in this example performed in the host computer 102.

The term concurrent refers to executing with overlapping operations and not requiring waiting for the one the commands 130 to be done with the entire flow shown in FIG. 3 and completed before processing another command 130 at a different stage of the flow in FIG. 3. Similarly, different command ports in the address map 110 can be used by the command issue 302 even before the command transmission 304 has completed processing the earlier command 130. As an example of an embodiment, the limitation of one command 130 processing can be implement where one of the commands 130 must be completely removed from the command transmission 304 before any of those command ports can be used for the next command 130.

Also for example, the flow chart can have iterations and loops. In the example of error detected in the command assemble 308, instead of sending an erroneous version of the command 130 to the command queue 138, the flow can progress from the command assemble 308 back to the command issue 302, the command transmission 304, the command extraction 306, or a combination thereof.

Figure 4:
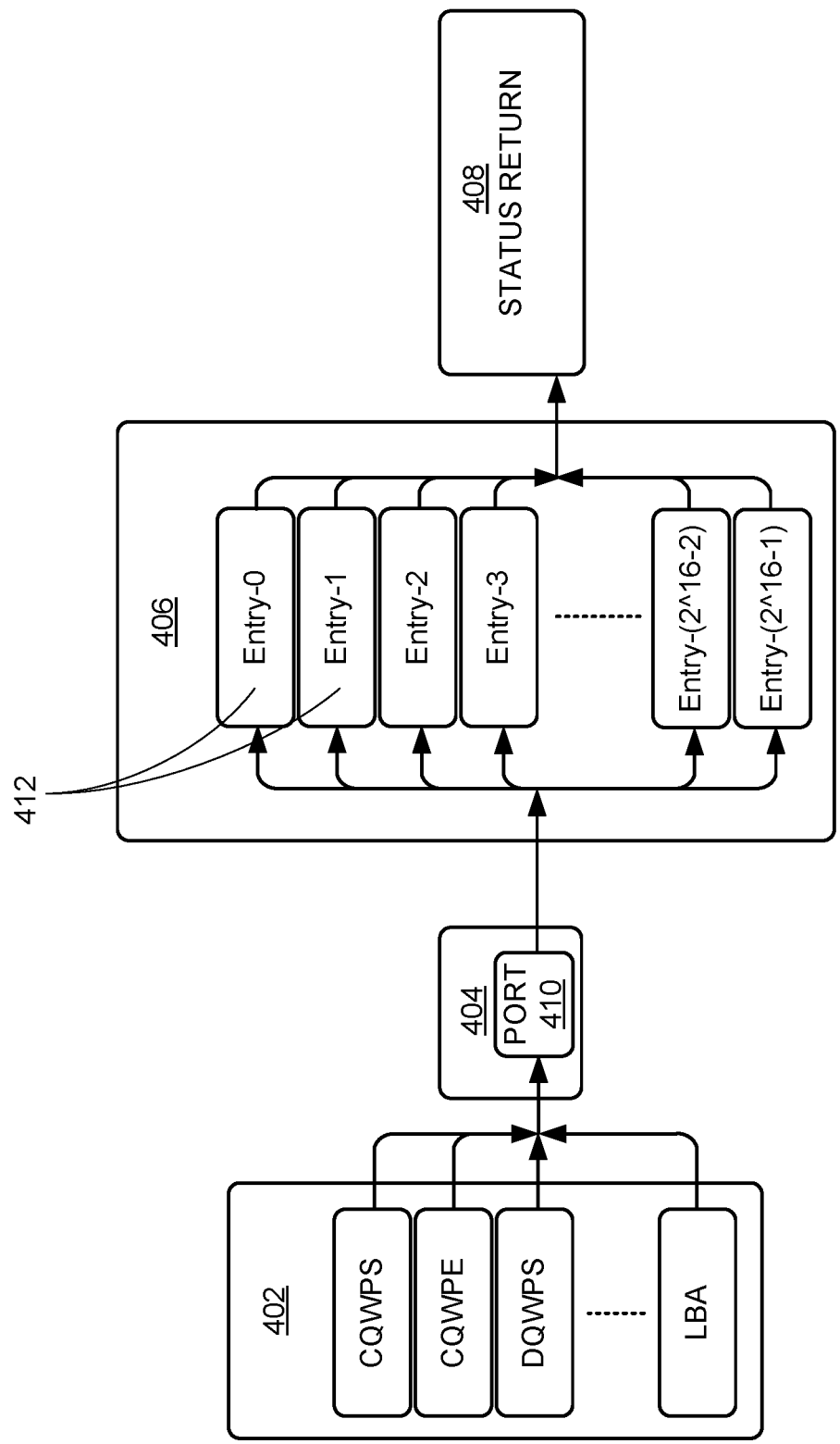
FIG. 4 is an example of a flow chart for retrieving the status with the communication mechanism utilized by the computing system in an embodiment.

Referring now to FIG. 4, therein is shown an example of a flow chart for retrieving status information 141 of FIG. 1 with the communication mechanism utilized by the computing system 100 of FIG. 1 in an embodiment. Table 2 includes examples for the status information 141 in the configuration status block 140 of FIG. 1.

TABLE 2

| Field | Width | Comments | Type |
|---|---|---|---|
| | | Status | |
| CQWPS | 16 | CMD Queue Start Pointer (example max 64K CMD entries) | SQ |
| CQWPE | 16 | CMD Queue End Pointer | SQ |
| DQWPS | 16 | Data Queue Start Pointer (example DB size of 32M and sector min size of 512) | DQ |
| DQWPE | 16 | Data Queue End Pointer | DQ |
| VALID | 8 | Cleared by host computer 102 when the end of read operation of user data. | CQRead |
| SEC_MAP | 8 | Data Bit Map (example for 512 sector size): Valid sector (512 B) location in 4 KB | CQRead |
| CMD_ID | 16 | CMD Tag. From CMD ID in CMD Area. | CQRead |
| STATUS | 16 | Might be over provision and x10 s in NVME) (only 4 states are defined in GMI | CQRead |
| SEC_CNT | 16 | Sector Count: prepared data size based on sector size unit (512 B or 4 KB). | CQRead |
| LBA | 48 | start point of prepared data (depends on the supporting max read size) | CQRead |

Every CMD_ID represents a command used to operate memory device on the storage system 101. For example, the commands can be read, write, status query, clear, or a combination thereof. All commands are predefined and can be assigned with a unique identification.

The flow chart depicted in FIG. 4 is an example of the processing of reading the status information 141. This example depicts the process occurring within the storage system 101 of FIG. 1. In this example, the command processing can be described as in FIG. 3 and that portion of the flow chart is not drawn in this figure for illustrative brevity.

In this example, the flow chart can include a status preparation 402, a status load 404, a redundancy map 406, and a status return 408. The status preparation 402 directs the appropriate status information 141 being requested. Examples of the status information 141 is shown in Table 2. The status load 404 loads a read port register 410 for the status request. The redundancy map 406 provides protection information 412 that can be used for error detection or error correction based on the status information 141. The protection information 412 can also include scrambling and swizzling of data, both of which can be proprietary and not readily known. The status return 408 provides the status information 141 as well as the protection information 412, if any. The protection information 412 is typically proprietary and embodiments enable data to be stored in the storage system 101 as data without needing to know the details of ECC, scrambling, swizzling, or a combination thereof.

It has been discovered that embodiments enable the flexibility to operate with a communication mechanism without requiring to know details of the protection information 412 from the host computer 102, or more specifically the host central processing unit 104, of that communication mechanism. Embodiments enable processing and transmission of the commands 130 over the command address medium 122. Meanwhile, embodiments enable the host computer 102 or the host central processing unit 104 to still utilize and send the protection information 412 over the data medium 124.

As an example, the host computer 102 of FIG. 1 can request a status by issuing a write command 130 of FIG. 3 with the command issue 302 of FIG. 3. The command transmission 340 of FIG. 3 can deliver the command 130, as a more specific example as the command packets 131, for the status information 141 over the command address medium 122 of FIG. 2 and with the appropriate identification of the specific status information 141 being requested. As in this example, the identification can be one of the fields for the status information 141 shown in Table 2.

The storage system 101 can process the command 130 for the status information 141 leveraging at least a portion of the flow described in FIG. 3. As a specific example, the command packet generator 128 of FIG. 1 can partition or divide the information from the command address medium 122 for the command packet 131 of FIG. 1. The command packet assembler 136 of FIG. 1 can order the command packets 131. After full assembly, the command 130 can be sent to the configuration status block 140 from the command packet assembler 136.

In this example, the configuration status block 140 can perform the status preparation 402. The identification from the command 130 can be matched to one of the fields for the status information 141 as shown in Table 2. The status information 141 matching the identification can be selected and the storage system 101 can direct that portion of the status information 141 with the status load 404.

The status load 404 can load the status information 141 from the status preparation 402 to the read port register 410. As an example, the read port register 410 can be accessed through the address map 110 of FIG. 2 and the status read port 210 of FIG. 2. Also for example, the read port register 410 can be part of or external to the response buffer of FIG. 1. Also as an example, the read port register 410 can be part of or external to the host read buffer 134 of FIG. 1. The flow can continue from status load 404 to the redundancy map 406.

The redundancy map 406 provides the protection information 412 associated with the status information 141 in the read port register 410. The redundancy map 406 can provide the protection information 412 in a number of ways. For example, the protection information 412 can be attained from training from the status information 141 sent from the storage system 101 to the host computer 102. The training can be based on the various fields for the status information 141 in Table 2 being known and the protection information 412 is unknown. As a specific example, the training can be performed by the commend block 116 of FIG. 1, the controller 118 of FIG. 1, or a combination thereof. Leveraging the known allows for the calculation of what would be the protection information 412, which can be stored in a look-up table (LUT). The protection information 412 can be an entry in the LUT where the value of the status information 141 can be used as an index to the LUT.

The execution of the redundancy map 406 can be invoked by a number of triggers. As an example, the redundancy map 406 can be performed based on the command 130 as the write function specifying the identification of which field of the status information 141 is requested. As a further example, the redundancy map 406 can be performed based on the command 130 for reading the status information 141, which is described as follows.

The host computer 102 can issue the command 130 for reading the status information 141 and the associated protection information 412. As an example, the host computer 102 can perform a direct read of the status information 141 without using the command issue 302 or the command transmission 304. The direct read can be performed with the host computer 102 by issuing the address of the read port register 410 on the command address medium 122. The status return 408 can operate such that the read port register 410 can return the status information 141 and the associated protection information 412 over the data medium 124 of FIG. 1.

As a specific example, if the command 130 is "RdStatus" written to the bank group 202 of FIG. 2 E Hex or the status configuration read or clear 212 of FIG. 2, the status information 141 that has been specified is moved to the read port register 410. The value in the read port register 410 is used to retrieve the protection information 412 from the LUT. The status information 141, the protection information 412, or a combination thereof can be moved to the configuration status block 140, the host read buffer 134, or a combination thereof to be read by the host computer 102. If the command 130 is written to the bank group 202 F Hex, then the status information 141, the protection information 412, or a combination thereof is read out of the configuration status block 140, the host read buffer 134, or a combination thereof. If the command 130 is "ClrStatus" is written to the bank group 202 E Hex, then portions of the status information 141 can be cleared.

Figure 5:
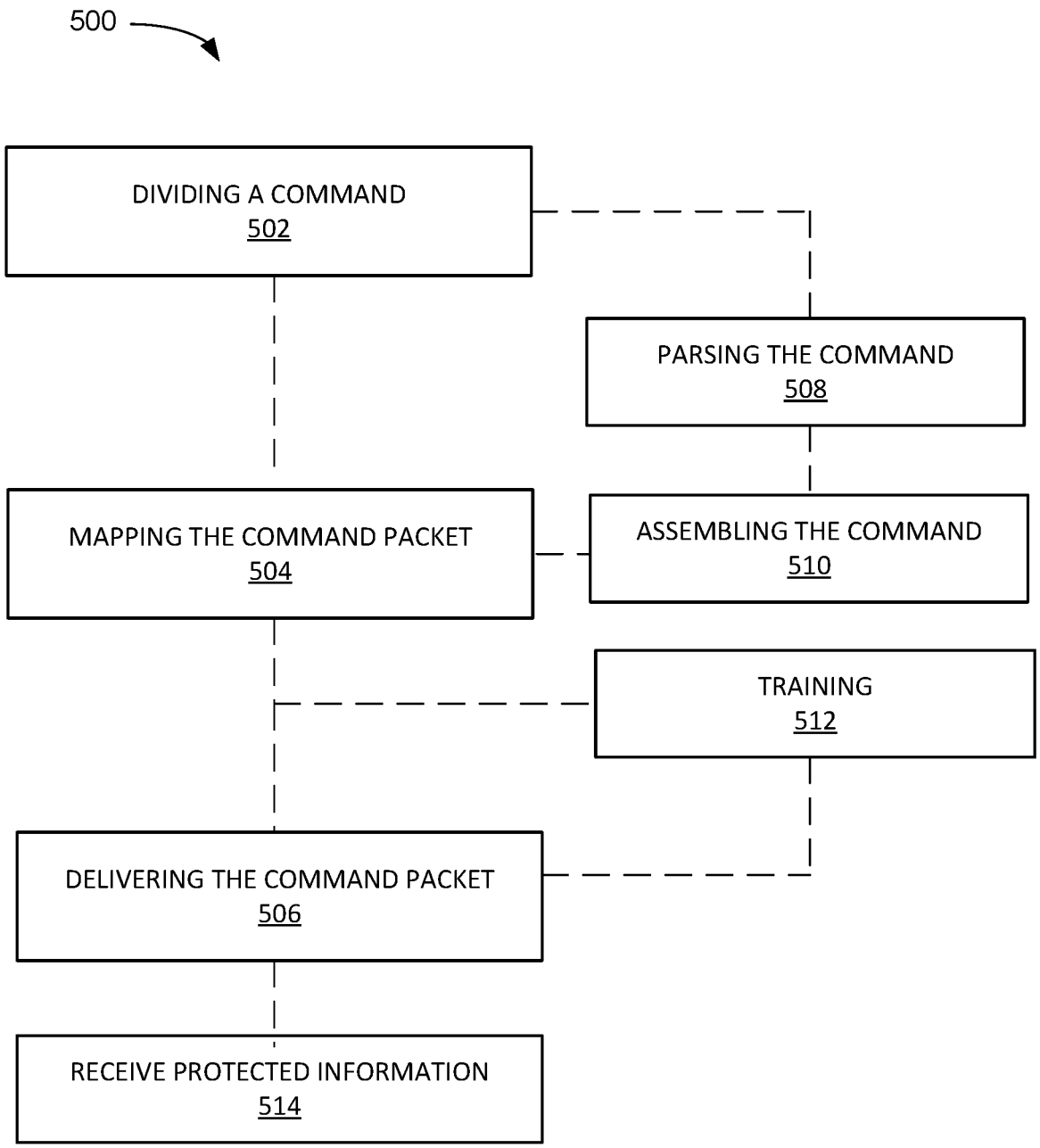
FIG. 5 is a flow chart of a method of operation of a computing system in an embodiment of the present invention.

Referring now to FIG. 5, therein is shown a flow chart of a method of operation of a computing system 100 in an embodiment of the present invention. The method 500 includes: dividing a command to a command packet with a driver in a block 502; mapping the command packet to an address map in a block 504; and delivering the command packet based on the address map over a command address medium in a block 506.

As an example, the block 502 can be performed by the host computer 102 of FIG. 1 or as a specific example by the host central processing unit 104 of FIG. 1. Also as an example, the block 504 can be performed by the host computer 102 or as a specific example by the host central processing unit 104. Further for example, the block 506 can be performed by the host computer 102 or as a specific example by the peripheral interface 112 of FIG. 1.

The block 506 can also further include accessing a bank of the address map. The block 506 can also further include delivering the command for a write based on the address map to request status information and the method 500 further includes issuing a further command for a read of the status information.

The method 500 can further include parsing the command packet from the command address medium 508 or assembling the command from the command packet from the command address medium 510. The method 500 can yet further include training to calculate a protection information 512 or receiving a protection information over a data medium 514.

The method 500 can further include ordering the command packet to assemble the command or not receiving the command packet over a data medium and this ordering can be executed by the command block 116 of FIG. 1. The method 500 can also further include providing a non-volatile storage by the storage system 101 of FIG. 1.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    a host interface configured to:
        communicate through a command address medium supporting a command and address bus based protocol,
        receive a command packet from the command address medium by way of the command and address bus based protocol, and
        parse the command packet received through the command address medium;
        transfer data through a data medium separate from the command address medium wherein the data includes an error correction code (ECC) encoding; and
    a command block, coupled to the host interface, configured to:

assemble a command from the command packet, and store the data, transferred through the data medium, including the error correction code (ECC) encoding as transferred through the data medium.

2. The system as claimed in claim 1 wherein the command block is further configured to train to calculate a protection information.

3. The system as claimed in claim 1 wherein the host interface is further configured to receive a protection information over the data medium separate from the command address medium.

4. The system as claimed in claim 1 wherein the command block is further configured to order the command packet to assemble the command.

5. The system as claimed in claim 1 wherein the host interface is further configured to not receive the command packet over the data medium separate from the command address medium.

6. The system as claimed in claim 1 wherein the host interface is further configured to receive the command packet over a volatile memory interface for a non-volatile device.

\* \* \* \* \*